United States Patent
Lant et al.

(10) Patent No.: US 10,421,932 B2
(45) Date of Patent: *Sep. 24, 2019

(54) CLEANING COMPOSITION WITH INSOLUBLE QUATERNIZED CELLULOSE PARTICLES AND NON-ANIONIC PERFORMANCE POLYMERS

(71) Applicant: The Procter & Gamble Company, Cincinnati, OH (US)

(72) Inventors: Neil Joseph Lant, Newcastle upon Tyne (GB); Adam Simon Hayward, Durham (GB)

(73) Assignee: The Procter & Gamble Company, Cincinnati, OH (US)

( * ) Notice: Subject to any disclaimer, the term of this patent is extended or adjusted under 35 U.S.C. 154(b) by 26 days.

This patent is subject to a terminal disclaimer.

(21) Appl. No.: 15/652,335

(22) Filed: Jul. 18, 2017

(65) Prior Publication Data

US 2018/0023043 A1 Jan. 25, 2018

Related U.S. Application Data

(60) Provisional application No. 62/365,199, filed on Jul. 21, 2016.

(51) Int. Cl.

| | | |
|---|---|---|
| *C11D 3/14* | (2006.01) | |
| *C11D 17/00* | (2006.01) | |
| *C08B 15/06* | (2006.01) | |
| *C11D 1/14* | (2006.01) | |
| *C11D 1/24* | (2006.01) | |
| *C11D 1/29* | (2006.01) | |
| *C11D 3/00* | (2006.01) | |
| *C11D 3/22* | (2006.01) | |
| *C11D 3/37* | (2006.01) | |
| *C11D 17/04* | (2006.01) | |

(52) U.S. Cl.
CPC .......... *C11D 17/0013* (2013.01); *C08B 15/06* (2013.01); *C11D 1/143* (2013.01); *C11D 1/146* (2013.01); *C11D 1/24* (2013.01); *C11D 1/29* (2013.01); *C11D 3/0021* (2013.01); *C11D 3/227* (2013.01); *C11D 3/3723* (2013.01); *C11D 17/0004* (2013.01); *C11D 17/043* (2013.01); *C11D 17/045* (2013.01)

(58) Field of Classification Search
CPC ....... C11D 3/0021; C11D 3/14; C11D 3/3723; C11D 11/0017
See application file for complete search history.

(56) References Cited

U.S. PATENT DOCUMENTS

| | | | |
|---|---|---|---|
| 4,830,784 A * | 5/1989 | Meffert | C11D 3/0036 510/349 |
| 8,889,610 B2 | 11/2014 | Labeque et al. | |
| 8,895,493 B2 | 11/2014 | Labeque et al. | |
| 2008/0280807 A1* | 11/2008 | Grainger | C11D 1/62 510/522 |
| 2009/0169502 A1* | 7/2009 | Quadir | A61K 8/36 424/70.9 |
| 2011/0269657 A1* | 11/2011 | Dihora | A61K 8/11 510/119 |
| 2011/0319310 A1* | 12/2011 | Labeque | C11D 3/227 510/296 |
| 2015/0182438 A1* | 7/2015 | Fujii | A61K 8/46 132/202 |
| 2016/0040103 A1* | 2/2016 | Depoot | C11D 1/66 510/296 |
| 2016/0186097 A1* | 6/2016 | Fantini | C11D 3/0021 510/513 |
| 2016/0201015 A1* | 7/2016 | Dihora | A01N 25/26 510/101 |

FOREIGN PATENT DOCUMENTS

| | | |
|---|---|---|
| FR | 2759376 | 8/1998 |
| WO | 0166600 | 9/2011 |
| WO | 2016113436 | 8/2016 |

OTHER PUBLICATIONS

U.S. Appl. No. 15/652,328, filed Jul. 21, 2017, Neil Joseph Lant.
14426 EP Search Report for application No. 17182308.1-1375, dated Aug. 12, 2017, 10 pages., EP.
14427 Search Report for application No. 17182309.9-1375, dated Aug. 12, 2017, 12 pages., EP.

* cited by examiner

*Primary Examiner* — Charles I Boyer
(74) *Attorney, Agent, or Firm* — Andres E. Velarde; Gregory S. Darley-Emerson

(57) ABSTRACT

Cleaning compositions that include an insoluble cationically-modified cellulose and a soluble performance polymer. Methods of making and using such cleaning compositions.

10 Claims, No Drawings

CLEANING COMPOSITION WITH INSOLUBLE QUATERNIZED CELLULOSE PARTICLES AND NON-ANIONIC PERFORMANCE POLYMERS

FIELD OF THE INVENTION

The present disclosure relates to cleaning compositions that include insoluble cationically-modified cellulose particles and a soluble performance polymer. The present disclosure also relates to methods of making and using such cleaning compositions.

BACKGROUND OF THE INVENTION

During the laundering process, substantive dyes from fabrics may be released into the wash liquor and redeposit onto other fabric surfaces. This dye transfer phenomenon leads to various problems including degradation of whiteness, shifts in hue of colored items and loss of contrast at the interfaces between regions of different color within the same item. Some dye control agents (or dye transfer inhibitors) are known, but they may have negative interactions with other components of the cleaning composition and may not perform as well. There is a need for improved cleaning compositions that provide improved control of fugitive dyes in laundering processes.

SUMMARY OF THE INVENTION

The present disclosure relates to liquid cleaning compositions that include an insoluble cationically-modified cellulose and a soluble performance polymer, where the soluble performance polymer comprises a non-anionic soluble performance polymer. The cellulose particles may comprise a cellulose substrate functionalized with a quaternary ammonium compound of formula (I):

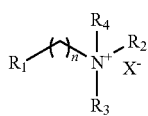

where: n is between 1 and 20; $R_1$ is selected from oxiranyl and 2-chloro-1-hydroxylethyl; $R_2$ and $R_3$ are independently selected from alkyl groups $C_{1-6}$ and benzyl; $R_4$ is selected from alkyl groups $C_{1-20}$; and X is selected from the group consisting of Cl, Br, I, tetrafluoroborate, trifluoromethanesulphonate and nitrate.

The present disclosure also relates to a method of cleaning a surface, preferably a textile, where the method includes mixing the cleaning composition as described herein with water to form an aqueous liquor and contacting a surface, preferably a textile, with the aqueous liquor in a laundering step.

DETAILED DESCRIPTION OF THE INVENTION

The present disclosure relates to cleaning compositions that include insoluble cationically modified cellulose particles and a soluble performance polymer. Performance polymers can provide performance benefits to a target surface, but some polymers, such as anionic soluble performance polymers, can negatively interact with the insoluble cationically modified cellulose particles; these interactions may negatively impact the performance of the performance polymer, the cellulose particle, or both. Without wishing to be bound by theory, it is believe that providing a composition that includes an insoluble cationically-modified cellulose particle and a non-anionic soluble performance polymer results in better performance and/or product stability. It may further be desirable to minimize, or even eliminate, the relative amounts of anionic soluble performance polymers in the composition.

The components of the compositions and processes of the present disclosure are described in more detail below.

As used herein, the articles "a" and "an" when used in a claim, are understood to mean one or more of what is claimed or described. As used herein, the terms "include," "includes," and "including" are meant to be non-limiting. The compositions of the present disclosure can comprise, consist essentially of, or consist of, the components of the present disclosure.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure.

In all embodiments of the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

As used herein, the term "alkoxy" is intended to include C1-C8 alkoxy and C1-C8 alkoxy derivatives of polyols having repeating units such as butylene oxide, glycidol oxide, ethylene oxide or propylene oxide.

As used herein, unless otherwise specified, the terms "alkyl" and "alkyl capped" are intended to include C1-C18 alkyl groups, or even C1-C6 alkyl groups.

As used herein, unless otherwise specified, the term "aryl" is intended to include C3-12 aryl groups.

As used herein, unless otherwise specified, the term "arylalkyl" and "alkaryl" are equivalent and are each intended to include groups comprising an alkyl moiety bound to an aromatic moiety, typically having C1-C18 alkyl groups and, in one aspect, C1-C6 alkyl groups.

The terms "ethylene oxide," "propylene oxide" and "butylene oxide" may be shown herein by their typical designation of "EO," "PO" and "BO," respectively.

As used herein, the term "cleaning and/or treatment composition" includes, unless otherwise indicated, granular, powder, liquid, gel, paste, unit dose, bar form and/or flake type washing agents and/or fabric treatment compositions, including but not limited to products for laundering fabrics, fabric softening compositions, fabric enhancing compositions, fabric freshening compositions, and other products for the care and maintenance of fabrics, and combinations thereof. Such compositions may be pre-treatment compositions for use prior to a washing step or may be rinse added compositions, as well as cleaning auxiliaries, such as bleach additives and/or "stain-stick" or pre-treat compositions or substrate-laden products such as dryer added sheets.

As used herein, "particles" with regard to the cellulose particles described herein means materials that are solids in the cleaning compositions. The particles can have any suitable shape, including being roughly spherical and/or fiber-like.

As used herein, "insoluble" with regard to the cellulose particles means having a solubility of less than 50% in the following test: Prepare a beaker of 100 ml deionised water, maintained at 30° C. equipped with an overhead stirrer at 600 rpm with triangular blade 5 cm from the bottom of the beaker. Slowly add 500 mg of dry polymer continuously over the course of 5 minutes to the centre of the vortex and continue stirring for 3 hours. Divide the contents of the beaker into four 50 ml centrifuge tubes and centrifuge for at 3000×g for 5 minutes, decant the supernatant and dry the total residue at 105° C. for 1 h. If the mass of dry residue is greater than 250 mg, the cationically modified cellulose is deemed to be insoluble for the purposes of the present disclosure.

As used herein, "soluble" with regard to the performance polymer means having a solubility of greater than 50% in the above-mentioned test.

As used herein, the term "maximum extinction coefficient" is intended to describe the molar extinction coefficient at the wavelength of maximum absorption (also referred to herein as the maximum wavelength), in the range of 400 nanometers to 750 nanometers.

As used herein "average molecular weight" is reported as a weight average molecular weight, as determined by its molecular weight distribution; as a consequence of their manufacturing process, polymers disclosed herein may contain a distribution of repeating units in their polymeric moiety.

Cleaning Composition

The present disclosure relates to cleaning compositions. The cleaning composition may be selected from the group of light duty liquid detergents compositions, heavy duty liquid detergent compositions, hard surface cleaning compositions, detergent gels commonly used for laundry, bleaching compositions, laundry additives, fabric enhancer compositions, shampoos, body washes, other personal care compositions, and mixtures thereof. The cleaning composition may be a hard surface cleaning composition (such as a dishwashing composition) or a laundry composition (such as a heavy duty liquid detergent composition).

The cleaning compositions may be in any suitable form. The composition can be selected from a liquid, solid, or combination thereof. As used herein, "liquid" includes free-flowing liquids, as well as pastes, gels, foams and mousses.

Non-limiting examples of liquids include light duty and heavy duty liquid detergent compositions, fabric enhancers, detergent gels commonly used for laundry, bleach and laundry additives. Gases, e.g., suspended bubbles, or solids, e.g. particles, may be included within the liquids. A "solid" as used herein includes, but is not limited to, powders, agglomerates, and mixtures thereof. Non-limiting examples of solids include: granules, micro-capsules, beads, noodles, and pearlised balls. Solid compositions may provide a technical benefit including, but not limited to, through-the-wash benefits, pre-treatment benefits, and/or aesthetic effects.

The cleaning composition may be in the form of a unitized dose article, such as a tablet or in the form of a pouch. Such pouches typically include a water-soluble film, such as a polyvinyl alcohol water-soluble film, that at least partially encapsulates a composition. Suitable films are available from MonoSol, LLC (Indiana, USA). The composition can be encapsulated in a single or multi-compartment pouch. A multi-compartment pouch may have at least two, at least three, or at least four compartments. A multi-compartmented pouch may include compartments that are side-by-side and/or superposed. The composition contained in the pouch may be liquid, solid (such as powders), or combinations thereof.

Insoluble Cationically Modified Cellulose

Insoluble cationically modified cellulose, present as particles or nanofibers, is capable of adsorbing rogue textile dyes in the laundry process to prevent colour transfer between garments. Insoluble cationically modified cellulose consists of a cellulose substrate functionalized with a quaternary ammonium compound of formula (I):

where:

n is between 1 and 20;

$R_1$ is selected from oxiranyl and 2-chloro-1-hydroxyl-ethyl;

$R_2$ and $R_3$ are independently selected from alkyl groups $C_{1-6}$ and benzyl;

$R_4$ is selected from alkyl groups $C_{1-20}$;

X is selected from the group consisting of Cl, Br, I, tetrafluoroborate, trifluoromethanesulphonate and nitrate.

The substrate may be cellulose selected from the group consisting of: cellulose particles and cellulose nanofibers obtained by electrospinning.

It has been found that insoluble cationically modified cellulose, prepared as particles or nanofibers from electro-spinning, offers superior dye transfer inhibition properties compared to products described in the prior art, particularly with respect to commercial products such as non-woven cellulose-based laundry additives. Accordingly, insoluble cationically modified cellulose can also be used as a suitable laundry additive to prevent colour transfer between garments.

The composition may comprise from about 0.1% to about 5%, by weight of the composition, of the insoluble cellulose particles.

The Cellulose Substrate

The cellulose substrate used to prepare insoluble cationically modified cellulose in the present invention is particulate cellulose or in the form of cellulose nanofibers obtained from electrospinning.

In a preferred embodiment of the invention, the cellulose substrate is cellulose particles.

The cellulose particles used in the scope of the present invention are microparticles or nanoparticles of cellulose, i.e. have an average size on the order of micrometers (or microns), usually between 1 µm and 1000 µm, or the order of nanometers, usually between 1 nm and 1000 nm.

The distinction between microparticles and nanoparticles cellulose is not always well defined because usually the particles are not granular, i.e., have an approximately spherical shape, but are fibrillar, typically defined in terms of its average thickness (E) and their average length (L), so that usually, the cellulose particles are classified as nanoparticles if at least one of these dimensions, particularly the thickness is less than 1 µm. Particles in fiber form are usually characterized by a parameter called "aspect ratio", which is the ratio between the length and thickness of the fibers.

Within the scope of the present invention, the cellulose particles employed are characterized as having an average size between 0.01 and 400 µm, more preferably between 0.05 and 200 µm. Said average size of the cellulose particles, whose shape is irregular, as indicated above, usually refers to the average equivalent diameter, ie the diameter of a sphere of equivalent volume of the particle. In the context of the present invention the term is used interchangeably to refer to medium sized average diameter or average diameter equivalent.

The average size of the cellulose particles, defined by average equivalent diameter can be determined by conventional analytical procedures for measuring the average particle size, which are well known to the skilled person, for example, screening methods, relating the electric current (Coulter counter), by scattering of laser light or by using electron microscopy, including scanning electron microscopy (SEM), or transmission electron microscopy (TEM). The most common methods for defining and measuring particle size are found in the following book: ME Aulton, Pharmacy. The science of designing dosage forms, second edition, Elsevier, Madrid, 2004, Chapter 10, pp 154-167.

According to a preferred embodiment of the invention, the cellulose particles used for the insoluble cationically modified cellulose are selected from the group consisting of microcrystalline cellulose, cellulose powder, microfibrillated cellulose, nanocrystalline cellulose, and cellulose nanofibers obtained by electrospinning and then subsequently crushed or ground. Cellulose particles preferably selected from microcrystalline cellulose, microfibrillated cellulose and nanofibers obtained by electrospinning and ground are used. Even more preferably, cellulose particles selected from microcrystalline cellulose and microfibrillated cellulose used.

In one embodiment of the invention, the cellulose particles are from microcrystalline cellulose.

Microcrystalline cellulose is a crystalline powdery substance, obtained by controlled hydrolysis of α-cellulose, whose characteristics are well known and are described, for example, in the handbook of pharmaceutical excipients, R C Rowe, P J Sheskey and P J Weller, Handbook of Pharmaceutical Excipients, fourth edition, Pharmaceutical Press, 2003.

Microcrystalline cellulose usually has an average particle size range between 20 and 300 µm, depending on the supplier and preparation process. Preferably, a microcrystalline cellulose with an average particle size of between 40 and 150 µm, more preferably between 50 and 120 µm, and most preferably between 70 and 100 µm used.

Microcrystalline cellulose particles are granular, with an approximately spherical shape with a "aspect ratio" usually between approximately 1 and 3.

Microcrystalline cellulose is commercially available from various vendors, for example by FMC Biopolymer under the general trade name AVICEL®; Acros Organics with an average particle size of 50 or 90 µm; Sigma-Aldrich under the name microcrystalline 310697, with an average particle size of 20 µm; and also JRS (J. Rettenmaier & Sohne) under the names Vivapur® or HEWETEN® in different particle sizes, for example HEWETEN® 102, with an average particle size of 90 µm.

In another embodiment of the invention, the cellulose particles are from cellulose powder.

Powdered cellulose is a powder obtained by reducing the size of α-cellulose by mechanical means, whose characteristics are specified, for example, in the book R C Rowe, cited above, and having a particle size usually between 20 µm and 250 µm. Cellulose in powder form is commercially available, for example through from J. Rettenmaier & Sohne, under the general tradename ARBOCEL®, such as ARBOCEL M80 or ARBOCEL A300, for example.

In another embodiment of the invention, the cellulose particles are from microfibrillated cellulose.

The microfibrillated cellulose (MFC, cellulose microfibrillated) has dimensions which usually vary between 0.01 and 4 µm medium thickness, preferably between 0.01 and 0.1 µm, and between 1 µm and 100 µm average length. Usually they have an "aspect ratio" of up to 100 maximum. Alternatively, the microfibrillated cellulose may be characterized by the average diameter, or equivalent average diameter of the particles, which is commonly between 0.05 and 15 µm.

The microfibrillated cellulose is obtained from cellulose or from microcrystalline cellulose, by mechanical homogenization treatment at high pressure, optionally accompanied by a chemical or enzymatic treatment. Microfibrillated cellulose has a thickness usually less than 1 µm, which normally is often referred to as nanocellulose or cellulose nanoparticles.

Microfibrillated cellulose is well known to the skilled person and is commercially available in different sizes from various suppliers, particularly from J. Rettenmaier & Sohne, for example, known under the tradename ARBOCEL® UFC 100, in which fibers have a length of about 8 µm.

In another embodiment of the invention, the cellulose particles are nanocrystalline cellulose.

The nanocrystalline cellulose is a highly crystalline form of cellulose, which is in the form of needles. It is obtained by the hydrolysis of cellulose with a strong acid under controlled conditions, for example, as described in Article Habibi of al. Cellulose nanocrystals: chemistry, self-assembly, and applications, Chem Rev., 2010, Jan. 10, p 3479-3500. The nanocrystalline cellulose is usually between 3 nm and 5 nm thick and up to 200 nm long.

In chapter Aspler et al. Review nanocellulosic products and their applications, the book: Biopolymer nanocomposites. Processing, properites and applications, Edited by A. Dufresne, S Thomas and L A Pothan, 2013, John Wiley & Sons (ISBN 18-21835-8978-1-1), Chapter 20, pp 461-508, describes properties microparticles and nanoparticles for the above mentioned cellulose.

In another embodiment of the invention, the cellulose particles are prepared by grinding cellulose nanofibers obtained by electrospinning. The particles obtained are in the form of fibers or filaments, and usually have an average diameter between 0.1 μm and 1 μm, more preferably between 0.3 μm and 0.8 μm, and an average length usually between 2 μm and 100 μm, more preferably between 3 μm and 80 μm, and most preferably between 4 μm and 50 μm.

The technique known as electrospinning is well known to the skilled person, and enables preparation of nanofibres from solution of a given material, usually polymers, by applying electric current with a sufficiently high voltage, which causes the expulsion of fine threads from a capillary while the solvent evaporates, thereby forming said material nanofibers. For example, to prepare cellulose nanofibers a solution of cellulose acetate in a solvent or solvent mixture, for example a mixture of acetone/dimethylacetamide, is used. Cellulose acetate can be obtained commercially. For example, Sigma-Aldrich sells cellulose acetate with an average molecular weight (Mn) of 30,000.

Suitable electrospinning conditions for cellulose acetate are, for example, a voltage of 30 kV, a flow of 3 to 4 mL/h, a distance to the collector of 12 cm, and a rotation speed of 500 rpm.

The spun cellulose acetate nanofibers are then hydrolysed, usually with a sodium hydroxide solution, to obtain the deacetylated cellulose nanofibers. The nanofibers are filtered and dried, preferably at a temperature between 40° C. and 80° C., more preferably between 55° C. and 65° C. for a period typically between 0.5 and 3 hours, preferably for about one hour.

The nanofibers obtained by the electrospinning process are then ground, for example with an IKA mill A 1 1 basic, for cellulose particles. The crushing step can be done on cellulose acetate nanofibers obtained directly electrospinning process and/or after the hydrolysis step, with deacetylated cellulose.

In another embodiment of the invention, the cellulose substrate used for the insoluble cationically modified cellulose are cellulose nanofibers prepared by electrospinning, but left unground.

Quaternary Ammonium Compound

The insoluble cationically modified cellulose consists of a cellulose substrate functionalized with a quaternary ammonium compound, characterized in that it has a high affinity for dyes or pigments.

Specifically, the quaternary ammonium compound used in the present invention is a compound of formula (I):

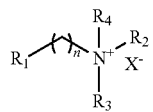

where:
n is between 1 and 20;
$R_1$ is selected from oxiranyl and 2-chloro-1-hydroxyethyl;
$R_2$ and $R_3$ are independently selected from alkyl groups $C_{1-6}$ and benzyl;
$R_4$ is selected from alkyl groups $C_{1-20}$;
X is selected from the group consisting of Cl, Br, I, tetrafluoroborate, trifluoromethanesulphonate and nitrate.

In the context of the present invention, an alkyl group $C_{1-6}$ refers to a saturated hydrocarbon group having 1 to 6 carbon atoms, which may be linear or branched, and includes, among others, methyl, ethyl, n-propyl, isopropyl, sec-butyl, tert-butyl, n-pentyl, 1-hexyl or 1-methylbutyl.

Similarly, an alkyl group $C_{1-20}$ refers to a saturated hydrocarbon group having 1 to 20 carbon atoms which may be linear or branched, and includes, among others, methyl, ethyl, n-propyl, isopropyl, sec-butyl, tert-butyl, n-pentyl, 1-methylbutyl, n-hexyl, n-octyl, n-decyl, n-dodecyl, n-tetradecyl, n-hexadecyl or n-octadecyl.

An n-alkyl $C_8$-$C_{18}$ refers to a linear saturated hydrocarbon group having 8 to 18 carbon atoms, and is formed by the n-octyl, n-nonyl, n-decyl, n-undecyl, n-dodecyl, n-tridecyl, n-tetradecyl, n-pentadecyl, n-hexadecyl, n-heptadecyl and n-octadecyl.

The oxiranyl group refers to the radical:

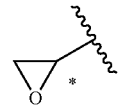 [SMILES: *C1CO1]

The 2-chloro-1 hydroxyethyl group refers to the radical:

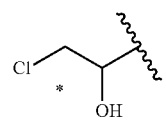 [SMILES: *C(O)CCl]

Accordingly, the anion tetrafluoroborate group refers to $BF_4^-$, the trifluoromethanesulphonate (or triflate) anion is $CF3(SO_3)^-$, and nitrate anion group corresponds to $NO_3^-$.

In a preferred embodiment of the invention, the compound of formula (I) is characterized by n is 1, $R_2$, $R_3$ and $R_4$ are selected from the group consisting of methyl, ethyl, n-propyl and isopropyl, and X is selected from the group consisting of Cl, Br, and I. In a more preferred embodiment $R_2$, $R_3$ and $R_4$ are methyl and X is Cl.

In a preferred embodiment of the invention $R_1$ is oxiranyl.

According to various particular embodiments of the invention, the quaternary ammonium compound of formula (I) is characterized in that:
n is between 1 and 20, preferably between 1 and 10, more preferably between 1 and 5, and most preferably n is 1;
$R_1$ is selected from: oxiranyl and 2-chloro-1-hydroxyethyl; more preferably R is oxiranyl;
$R_2$ and $R_3$ are independently selected from alkyl groups $C_{1-6}$, more preferably they are independently selected from the group consisting of methyl, ethyl, n-propyl and isopropyl; and most preferably $R_2$ and $R_3$ are both methyl;
$R_4$ is an alkyl group $C_{1-20}$, more preferably is selected from methyl, ethyl, n-propyl, isopropyl, or n-alkyl $C_8$-$C_{18}$, even more preferably $R_4$ is methyl; —X is selected from the group consisting of Cl, Br, I, tetrafluoroborate, trifluoromethanesulphonate and nitrate, preferably X is selected from Cl, Br and I, and most preferably X is Cl.

In a particularly preferred embodiment of the invention, the compound of formula (I) is characterized as n is 1, $R_1$ is oxiranyl; $R_2$, $R_3$ and $R_4$ are methyl and X is selected from Cl, Br, I, more preferably X is Cl. According to this embodiment, the product of formula (I) is glycidyl trimethylammonium chloride (CAS 3033-77-0), which it is commercially available from various vendors, such as Sigma-Aldrich (Switzerland) or SKW Quab Chemicals (Quab product 151).

In another particularly preferred embodiment of the invention, the compound of formula (I) is characterized n is 1, $R_1$ is 2-chloro-1-hydroxyethyl, $R_2$, $R_3$ and $R_4$ are methyl and X is selected from Cl, Br, I; more preferably X is Cl. According to this embodiment, the product of formula (I) is (3-chloro-2-hydroxypropyl) trimethylammonium chloride (CAS 3327-22-8 number) which can be obtained by Sigma Company Aldrich, or through SKW Quab Chemicals (Quab Product® 188).

In another preferred embodiment of the invention, the compound of formula (I) is characterized n is 1, $R_1$ is 2-chloro-1-hydroxyethyl; $R_2$ and $R_3$ are methyl, $R_4$ is selected from an n-alkyl $C_8$-$C_{18}$, more preferably is selected from n-octyl, n-dodecyl, n-hexadecyl, n-octadecyl and; and X is selected from Cl, Br, I, more preferably X is Cl. According to this embodiment, usually the compound of formula (I) is a mixture of at least two compounds with different $R_4$, in different proportions. Some of these products are available commercially through SKW Quab Chemicals, for example the commercial product Quab® 342 where $R_4$ is n-dodecyl, the commercial product Quab 360, a mixture of $R_4$=n-octyl and $R_4$=n-octadecyl; commercial product or Quab 426, a mixture of $R_4$=n-dodecyl, $R_4$=n-hexadecyl and $R_4$=n-octadecyl; in all R is 2-chloro-1-hydroxyethyl, $R_2$ and $R_3$ are methyl, and X is Cl.

Performance Polymer

The composition may comprise a water-soluble performance polymer. By "water-soluble" (or simply "soluble") in this section, it is meant the performance polymers are not insoluble as described herein (i.e., they have a solubility of greater than 50% according to the procedure described herein). As used herein, "performance polymer" means a polymer that provides a performance benefit to the target substrate of the composition. For example, for a target fabric, the performance benefit may relate to stain-removal, stain-repellency, whiteness, color-fastness, color rejuvenation, softness, etc.

The composition may comprise a non-anionic soluble performance polymer. The term "non-anionic soluble performance polymer" is defined as a polymer with molecular weight greater than 1000 g/mol that has overall neutral or positive charge in a 1% solution at pH 7. The composition may comprise an anionic soluble performance polymer. The term "anionic soluble performance polymer" is defined as a polymer with molecular weight greater than 1000 g/mol that has overall negative charge in a 1% solution at pH 7. The overall charge of polymers in solution can be determined using polyelectrolyte titration using the protocols defined in by Borukjov et al., Journal of Physical Chemistry B, 2000, 104, 11027-11034.

The composition may comprise at least 0.2% of soluble performance polymer. The composition may comprise from about 0.2% to about 10%, or to about 5%, by weight of the composition, of soluble performance polymer, preferably non-anionic soluble performance polymer. The composition may comprise less than 1%, or less than 0.7%, or less than 0.5%, or less than 0.2%, or less than 0.1%, by weight of the composition, of an anionic performance polymer. The composition may be substantially free of an anionic performance polymer, or comprise 0%. The ratio of non-anionic:anionic soluble performance polymer may be greater than 1, preferably greater than 3, most preferably greater than 5. The ratio of insoluble cationically-modified cellulose particles:anionic soluble performance polymer (if any present) may be greater than 1, or greater than 2, or greater than 3, or greater than 4, or greater than 5.

Suitable soluble performance polymers may be selected from: polymeric soil release agents; polymeric dispersing agents; alkoxylated polyamine polymers; polymeric grease cleaning polymers; cellulosic polymers; and mixtures thereof. These classes are described below. These classes include examples of non-anionic and anionic soluble performance polymers. For example, among the Polymeric Soil Release Agents, the non-ionic polymer Texcare SRN240 from Clariant is completely uncharged and is therefore a non-anionic soluble performance polymer, whereas Texcare SRA300 from Clariant contains sulfonate groups and is therefore an anionic soluble performance polymer. Similarly, among the Cellulosic Polymers, carboxymethyl cellulose is an anionic polymer whereas methyl hydroxyethyl cellulose is non-anionic. Where there is any doubt, for instance with amphoteric polymers, the charge at pH 7 can be determined experimentally as described above.

(i) Polymeric Soil Release Agents

Known polymeric soil release agents, hereinafter "SRA" or "SRA's", can optionally be employed in the present detergent compositions. If utilized, SRA's will generally comprise from 0.01% to 10.0%, typically from 0.1% to 5%, preferably from 0.2% to 3.0% by weight, of the composition.

Preferred SRA's typically have hydrophilic segments to hydrophilize the surface of hydrophobic fibers such as polyester and nylon, and hydrophobic segments to deposit upon hydrophobic fibers and remain adhered thereto through completion of washing and rinsing cycles thereby serving as an anchor for the hydrophilic segments. This can enable stains occurring subsequent to treatment with SRA to be more easily cleaned in later washing procedures.

SRA's can include, for example, a variety of charged, e.g., anionic or even cationic (see U.S. Pat. No. 4,956,447), as well as noncharged monomer units and structures may be linear, branched or even star-shaped. They may include capping moieties which are especially effective in controlling molecular weight or altering the physical or surface-active properties. Structures and charge distributions may be tailored for application to different fiber or textile types and for varied detergent or detergent additive products. Suitable soil release polymers are polyester soil release polymers such as Repel-o-tex polymers, including Repel-o-tex, SF-2 and SRP6 supplied by Rhodia. Other suitable soil release polymers include Texcare polymers, including Texcare SRA100, SRA300, SRN100, SRN170, SRN240, SRN300 and SRN325 supplied by Clariant. Other suitable soil release polymers are Marloquest polymers, such as Marloquest SL supplied by Sasol Examples of SRAs are described in U.S. Pat. Nos. 4,968,451; 4,711,730; 4,721,580; 4,702,857; 4,877,896; 3,959,230; 3,893,929; 4,000,093; 5,415,807; 4,201,824; 4,240,918; 4,525,524; 4,201,824; 4,579,681; and 4,787,989; European Patent Application 0 219 048; 279,134 A; 457,205 A; and DE 2,335,044.

(ii) Polymeric Dispersing Agents

Polymeric dispersing agents can advantageously be utilized at levels from about 0.1% to about 7%, by weight, in the compositions herein, especially in the presence of zeolite and/or layered silicate builders. Suitable polymeric dispersing agents include carboxylate polymer such as a maleate/acrylate random copolymer or polyacrylate homopolymer. Preferably the carboxylate polymer is a polyacrylate homopolymer having a molecular weight of from 4,000 Daltons to 9,000 Daltons, or maleate/acrylate copolymer with a molecular weight 60,000 Daltons to 80,000 Daltons. Polymeric polycarboxylates and polyethylene glycols, can also be used. Polyalkylene glycol-based graft polymer may prepared from the polyalkylene glycol-based compound and the monomer material, wherein the monomer material includes the carboxyl group-containing monomer and the optional additional monomer(s). Optional additional monomers not classified as a carboxyl group-containing monomer include sulfonic acid group-containing monomers, amino group-containing monomers, allylamine monomers, quaternized allylamine monomers, N vinyl monomers, hydroxyl group-containing monomers, vinylaryl monomers, isobutylene monomers, vinyl acetate monomers, salts of any of these, derivatives of any of these, and mixtures thereof. It is believed, though it is not intended to be limited by theory, that polymeric dispersing agents enhance overall detergent builder performance, when used in combination with other builders (including lower molecular weight polycarboxylates) by crystal growth inhibition, particulate soil release peptization, and anti-redeposition. Examples of polymeric dispersing agents are found in U.S. Pat. No. 3,308,067, European Patent Application No. 66915, EP 193,360, and EP 193,360.

(iii) Alkoxylated Polyamine Polymers

Soil suspension, grease cleaning, and particulate cleaning polymers may include the alkoxylated polyamines Such materials include but are not limited to ethoxylated polyethyleneimine, ethoxylated hexamethylene diamine, and sulfated versions thereof. Polypropoxylated derivatives are also included. A wide variety of amines and polyaklyeneimines can be alkoxylated to various degrees, and optionally further modified to provide the abovementioned benefits. A useful example is 600 g/mol polyethyleneimine core ethoxylated to 20 EO groups per NH and is available from BASF.

(iv) Polymeric Grease Cleaning Polymers

Suitable Polymeric Grease Cleaning Polymers include alkoxylated polycarboxylates and amphiphilic graft co-polymers.

Alkoxylated polycarboxylates include those prepared from polyacrylates are useful herein to provide additional grease removal performance. Such materials are described in WO 91/08281 and PCT 90/01815. Chemically, these materials comprise polyacrylates having one ethoxy side-chain per every 7-8 acrylate units. The side-chains are of the formula —(CH2CH2O)m (CH2)nCH3 wherein m is 2-3 and n is 6-12. The side-chains are ester-linked to the polyacrylate "backbone" to provide a "comb" polymer type structure. The molecular weight can vary, but is typically in the range of about 2000 to about 50,000. Such alkoxylated polycarboxylates can comprise from about 0.05% to about 10%, by weight, of the compositions herein.

Amphiphilic graft co-polymer, preferably the amphiphilic graft co-polymer comprises (i) polyethylene glycol backbone; and (ii) and at least one pendant moiety selected from polyvinyl acetate, polyvinyl alcohol and mixtures thereof. A preferred amphilic graft co-polymer is Sokalan HP22, supplied from BASF. Suitable polymers include random graft copolymers, preferably a a polyvinyl acetate grafted polyethylene oxide copolymer having a polyethylene oxide backbone and multiple polyvinyl acetate side chains. The molecular weight of the polyethylene oxide backbone is preferably about 6000 and the weight ratio of the polyethylene oxide to polyvinyl acetate is about 40 to 60 and no more than 1 grafting point per 50 ethylene oxide units.

(v) Cellulosic Polymers

The consumer products of the present invention may also include one or more cellulosic polymers including those selected from alkyl cellulose, alkylalkoxyalkyl cellulose, carboxyalkyl cellulose, alkyl carboxyalkyl cellulose. In one aspect, the cellulosic polymers are selected from the group comprising carboxymethyl cellulose, methyl cellulose, methyl hydroxyethyl cellulose, methyl carboxymethyl cellulose, and mixtures thereof. In one aspect, the carboxymethyl cellulose has a degree of carboxymethyl substitution from 0.5 to 0.9 and a molecular weight from 100,000 Da to 300,000 Da. Examples of carboxymethylcellulose polymers are carboxymethyl cellulose commercially sold by CPKelko as Finnfix® GDA, hydrophobically modified carboxymethyl cellulose, for example the alkyl ketene dimer derivative of carboxymethylcellulose sold commercially by CPKelco as Finnfix® SH1, or the blocky carboxymethylcellulose sold commercially by CPKelco as Finnfix® V.

Adjuncts

The cleaning compositions described herein may include other adjunct components. The cleaning compositions may comprise a surfactant system as described below. The cleaning composition may comprise a fabric shading agent as described below and/or an additional enzyme selected from lipases, amylases, proteases, mannanases, pectate lyases, cellulases, cutinases, and mixtures thereof. The cleaning composition may comprise a cleaning cellulase.

The composition may comprise a fabric shading agent. Suitable fabric shading agents include dyes, dye-clay conjugates, and pigments. Suitable dyes include small molecule dyes and polymeric dyes. Suitable small molecule dyes include small molecule dyes selected from the group consisting of dyes falling into the Colour Index (C.I.) classifications of Direct Blue, Direct Red, Direct Violet, Acid Blue, Acid Red, Acid Violet, Basic Blue, Basic Violet and Basic Red, or mixtures thereof. Preferred dyes include alkoxylated azothiophenes, Solvent Violet 13, Acid Violet 50 and Direct Violet 9.

The cleaning compositions described herein may include one or more of the following non-limiting list of ingredients: fabric care benefit agent; detersive enzyme; deposition aid; rheology modifier; builder; chelant; bleach; bleaching agent; bleach precursor; bleach booster; bleach catalyst; perfume and/or perfume microcapsules; perfume loaded zeolite; starch encapsulated accord; polyglycerol esters; whitening agent; pearlescent agent; enzyme stabilizing systems; scavenging agents including fixing agents for anionic dyes, complexing agents for anionic surfactants, and mixtures thereof; optical brighteners or fluorescers; polymer including but not limited to soil release polymer and/or soil suspension polymer; dispersants; antifoam agents; non-aqueous solvent; fatty acid; suds suppressors, e.g., silicone suds suppressors; cationic starches; scum dispersants; substantive dyes; colorants; opacifier; antioxidant; hydrotropes such as toluenesulfonates, cumenesulfonates and naphthalenesulfonates; color speckles; colored beads, spheres or extrudates; clay softening agents; anti-bacterial agents. Additionally or alternatively, the compositions may comprise surfactants, quaternary ammonium compounds, and/or solvent systems. Quaternary ammonium compounds may be present in fabric enhancer compositions, such as fabric softeners, and comprise quaternary ammonium cations that are positively charged polyatomic ions of the structure $NR_4^+$, where R is an alkyl group or an aryl group.

Surfactant System

The cleaning composition may comprise a surfactant system. The cleaning composition may comprise from about 1% to about 80%, or from 1% to about 60%, preferably from about 5% to about 50% more preferably from about 8% to about 40%, by weight of the cleaning composition, of a surfactant system.

Surfactants of the present surfactant system may be derived from natural and/or renewable sources.

The surfactant system may comprise an anionic surfactant, more preferably an anionic surfactant selected from the group consisting of alkyl sulfate, alkyl alkoxy sulfate, especially alkyl ethoxy sulfate, alkyl benzene sulfonate, paraffin sulfonate and mixtures thereof. The surfactant system may further comprise a surfactant selected from the group consisting of nonionic surfactant, cationic surfactant, amphoteric surfactant, zwitterionic surfactant, and mixtures thereof. The surfactant system may comprise an amphoteric surfactant; the amphoteric surfactant may comprise an amine oxide surfactant. The surfactant system may comprise a nonionic surfactant; the nonionic surfactant may comprise an ethoxylated nonionic surfactant.

Alkyl sulfates are preferred for use herein and also alkyl ethoxy sulfates; more preferably a combination of alkyl sulfates and alkyl ethoxy sulfates with a combined average ethoxylation degree of less than 5, preferably less than 3, more preferably less than 2 and more than 0.5 and an average level of branching of from about 5% to about 40%.

The composition of the invention comprises amphoteric and/or zwitterionic surfactant, preferably the amphoteric surfactant comprises an amine oxide, preferably an alkyl dimethyl amine oxide, and the zwitteronic surfactant comprises a betaine surfactant.

The most preferred surfactant system for the detergent composition of the present invention comprise from 1% to 40%, preferably 6% to 35%, more preferably 8% to 30% weight of the total composition of an anionic surfactant, preferably an alkyl alkoxy sulfate surfactant, more preferably an alkyl ethoxy sulfate, combined with 0.5% to 15%, preferably from 1% to 12%, more preferably from 2% to 10% by weight of the composition of amphoteric and/or zwitterionic surfactant, more preferably an amphoteric and even more preferably an amine oxide surfactant, especially and alkyl dimethyl amine oxide. Preferably the composition further comprises a nonionic surfactant, especially an alcohol alkoxylate in particular and alcohol ethoxylate nonionic surfactant.

Anionic Surfactant

Anionic surfactants include, but are not limited to, those surface-active compounds that contain an organic hydrophobic group containing generally 8 to 22 carbon atoms or generally 8 to 18 carbon atoms in their molecular structure and at least one water-solubilizing group preferably selected from sulfonate, sulfate, and carboxylate so as to form a water-soluble compound. Usually, the hydrophobic group will comprise a C8-C22 alkyl, or acyl group. Such surfactants are employed in the form of water-soluble salts and the salt-forming cation usually is selected from sodium, potassium, ammonium, magnesium and mono-, di- or tri-C2-C3 alkanolammonium, with the sodium cation being the usual one chosen.

The anionic surfactant can be a single surfactant but usually it is a mixture of anionic surfactants. Preferably the anionic surfactant comprises a sulfate surfactant, more preferably a sulfate surfactant selected from the group consisting of alkyl sulfate, alkyl alkoxy sulfate and mixtures thereof. Preferred alkyl alkoxy sulfates for use herein are alkyl ethoxy sulfates.

Sulfated Anionic Surfactant

Preferably the sulfated anionic surfactant is alkoxylated, more preferably, an alkoxylated branched sulfated anionic surfactant having an alkoxylation degree of from about 0.2 to about 4, even more preferably from about 0.3 to about 3, even more preferably from about 0.4 to about 1.5 and especially from about 0.4 to about 1. Preferably, the alkoxy group is ethoxy. When the sulfated anionic surfactant is a mixture of sulfated anionic surfactants, the alkoxylation degree is the weight average alkoxylation degree of all the components of the mixture (weight average alkoxylation degree). In the weight average alkoxylation degree calculation the weight of sulfated anionic surfactant components not having alkoxylated groups should also be included.

Weight average alkoxylation degree=
($x1$*alkoxylation degree of surfactant
$1+x2$*alkoxylation degree of surfactant
$2+\ldots$)/($x1+x2+\ldots$)

wherein $x1$, $x2$, ... are the weights in grams of each sulfated anionic surfactant of the mixture and alkoxylation degree is the number of alkoxy groups in each sulfated anionic surfactant.

Preferably, the branching group is an alkyl. Typically, the alkyl is selected from methyl, ethyl, propyl, butyl, pentyl, cyclic alkyl groups and mixtures thereof. Single or multiple alkyl branches could be present on the main hydrocarbyl chain of the starting alcohol(s) used to produce the sulfated anionic surfactant used in the detergent of the invention. Most preferably the branched sulfated anionic surfactant is selected from alkyl sulfates, alkyl ethoxy sulfates, and mixtures thereof.

The branched sulfated anionic surfactant can be a single anionic surfactant or a mixture of anionic surfactants. In the case of a single surfactant the percentage of branching refers to the weight percentage of the hydrocarbyl chains that are branched in the original alcohol from which the surfactant is derived.

In the case of a surfactant mixture the percentage of branching is the weight average and it is defined according to the following formula:

Weight average of branching (%)=[($x1$*wt %
branched alcohol 1 in alcohol $1+x2$*wt %
branched alcohol 2 in alcohol $2+\ldots$)/
($x1+x2+\ldots$)]*100 wherein $x1$, $x2$, ... are the weight in grams of each alcohol in the total alcohol mixture of the alcohols which were used as starting material for the anionic surfactant for the detergent of the invention. In the weight average branching degree calculation the weight of anionic surfactant components not having branched groups should also be included.

Suitable sulfate surfactants for use herein include water-soluble salts of C8-C18 alkyl or hydroxyalkyl, sulfate and/or ether sulfate. Suitable counterions include alkali metal cation or ammonium or substituted ammonium, but preferably sodium.

The sulfate surfactants may be selected from C8-C18 primary, branched chain and random alkyl sulfates (AS); C8-C18 secondary (2,3) alkyl sulfates; C8-C18 alkyl alkoxy sulfates (AExS) wherein preferably x is from 1-30 in which the alkoxy group could be selected from ethoxy, propoxy, butoxy or even higher alkoxy groups and mixtures thereof.

Alkyl sulfates and alkyl alkoxy sulfates are commercially available with a variety of chain lengths, ethoxylation and branching degrees. Commercially available sulfates include, those based on Neodol alcohols ex the Shell company, Lial-Isalchem and Safol ex the Sasol company, natural alcohols ex The Procter & Gamble Chemicals company.

Preferably, the anionic surfactant comprises at least 50%, more preferably at least 60% and especially at least 70% of a sulfate surfactant by weight of the anionic surfactant. Especially preferred detergents from a cleaning view point are those in which the anionic surfactant comprises more than 50%, more preferably at least 60% and especially at least 70% by weight thereof of sulfate surfactant and the sulfate surfactant is selected from the group consisting of alkyl sulfates, alkyl ethoxy sulfates and mixtures thereof. Even more preferred are those in which the anionic surfactant is an alkyl ethoxy sulfate with a degree of ethoxylation of from about 0.2 to about 3, more preferably from about 0.3 to about 2, even more preferably from about 0.4 to about 1.5, and especially from about 0.4 to about 1. They are also preferred anionic surfactant having a level of branching of from about 5% to about 40%, even more preferably from about 10% to 35% and especially from about 20% to 30%.

Sulfonate Anionic Surfactant

Suitable anionic sulfonate surfactants for use herein include water-soluble salts of C8-C18 alkyl or hydroxyalkyl sulfonates; C11-C18 alkyl benzene sulfonates (LAS), modified alkylbenzene sulfonate (MLAS) as discussed in WO 99/05243, WO 99/05242, WO 99/05244, WO 99/05082, WO 99/05084, WO 99/05241, WO 99/07656, WO 00/23549, and WO 00/23548; methyl ester sulfonate (MES); and alpha-olefin sulfonate (AOS). Those also include the paraffin sulfonates may be monosulfonates and/or disulfonates, obtained by sulfonating paraffins of 10 to 20 carbon atoms. The sulfonate surfactant may also include the alkyl glyceryl sulfonate surfactants.

Nonionic Surfactant

Nonionic surfactant, when present, is comprised in a typical amount of from 0.1% to 40%, preferably 0.2% to 20%, most preferably 0.5% to 10% by weight of the composition. Suitable nonionic surfactants include the condensation products of aliphatic alcohols with from 1 to 25 moles of ethylene oxide. The alkyl chain of the aliphatic alcohol can either be straight or branched, primary or secondary, and generally contains from 8 to 22 carbon atoms. Particularly preferred are the condensation products of alcohols having an alkyl group containing from 10 to 18 carbon atoms, preferably from 10 to 15 carbon atoms with from 2 to 18 moles, preferably 2 to 15, more preferably 5-12 of ethylene oxide per mole of alcohol. Highly preferred nonionic surfactants are the condensation products of guerbet alcohols with from 2 to 18 moles, preferably 2 to 15, more preferably 5-12 of ethylene oxide per mole of alcohol.

Other suitable non-ionic surfactants for use herein include fatty alcohol polyglycol ethers, alkylpolyglucosides and fatty acid glucamides.

Amphoteric Surfactant

The surfactant system may include amphoteric surfactant, such as amine oxide. Preferred amine oxides are alkyl dimethyl amine oxide or alkyl amido propyl dimethyl amine oxide, more preferably alkyl dimethyl amine oxide and especially coco dimethyl amino oxide Amine oxide may have a linear or mid-branched alkyl moiety. Typical linear amine oxides include water-soluble amine oxides containing one R1 C8-18 alkyl moiety and 2 R2 and R3 moieties selected from the group consisting of C1-3 alkyl groups and C1-3 hydroxyalkyl groups. Preferably amine oxide is characterized by the formula R1-N(R2)(R3) O wherein R1 is a C8-18 alkyl and R2 and R3 are selected from the group consisting of methyl, ethyl, propyl, isopropyl, 2-hydroxyethyl, 2-hydroxypropyl and 3-hydroxypropyl. The linear amine oxide surfactants in particular may include linear C10-C18 alkyl dimethyl amine oxides and linear C8-C12 alkoxy ethyl dihydroxy ethyl amine oxides. Preferred amine oxides include linear C10, linear C10-C12, and linear C12-C14 alkyl dimethyl amine oxides. As used herein "mid-branched" means that the amine oxide has one alkyl moiety having n1 carbon atoms with one alkyl branch on the alkyl moiety having n2 carbon atoms. The alkyl branch is located on the a carbon from the nitrogen on the alkyl moiety. This type of branching for the amine oxide is also known in the art as an internal amine oxide. The total sum of n1 and n2 is from 10 to 24 carbon atoms, preferably from 12 to 20, and more preferably from 10 to 16. The number of carbon atoms for the one alkyl moiety (n1) should be approximately the same number of carbon atoms as the one alkyl branch (n2) such that the one alkyl moiety and the one alkyl branch are symmetric. As used herein "symmetric" means that |n1-n2| is less than or equal to 5, preferably 4, most preferably from 0 to 4 carbon atoms in at least 50 wt %, more preferably at least 75 wt % to 100 wt % of the mid-branched amine oxides for use herein.

The amine oxide may further comprise two moieties, independently selected from a C1-3 alkyl, a C1-3 hydroxyalkyl group, or a polyethylene oxide group containing an average of from about 1 to about 3 ethylene oxide groups. Preferably the two moieties are selected from a C1-3 alkyl, more preferably both are selected as a C1 alkyl.

Zwitterionic Surfactant

Other suitable surfactants include betaines, such as alkyl betaines, alkylamidobetaine, amidazoliniumbetaine, sulfobetaine (INCI Sultaines) as well as the Phosphobetaine and preferably meets formula (I):

$$R^1-[CO-X(CH_2)_n]_x-N^+(R^2)(R_3)-(CH_2)_m-[CH(OH)-CH_2]_y-Y-(I)$$

wherein $R^1$ is a saturated or unsaturated C6-22 alkyl residue, preferably C8-18 alkyl residue, in particular a saturated C10-16 alkyl residue, for example a saturated C12-14 alkyl residue;

X is NH, $NR^4$ with C1-4 Alkyl residue $R^4$, O or S, n a number from 1 to 10, preferably 2 to 5, in particular 3, x 0 or 1, preferably 1, $R^2$, $R^3$ are independently a C1-4 alkyl residue, potentially hydroxy substituted such as a hydroxyethyl, preferably a methyl.

m a number from 1 to 4, in particular 1, 2 or 3, y 0 or 1 and

Y is COO, SO3, $OPO(OR^5)O$ or $P(O)(OR^5)O$, whereby $R^5$ is a hydrogen atom H or a C1-4 alkyl residue.

Preferred betaines are the alkyl betaines of the formula (Ia), the alkyl amido propyl betaine of the formula (Ib), the Sulfo betaines of the formula (Ic) and the Amido sulfobetaine of the formula (Id);

$$R_1-N^+(CH_3)_2-CH_2COO^- \quad (Ia)$$

$$R^1-CO-NH(CH_2)_3-N^{30}(CH_3)_2-CH_2COO^- \quad (Ib)$$

$$R^1-N^+(CH_3)_2-CH_2CH(OH)CH_2SO_3- \quad (Ic)$$

$R^1-CO-NH-(CH_2)_3-N^+(CH_3)_2-CH_2CH(OH)CH_2SO_3-$ (Id) in which $R^11$ as the same meaning as in formula I. Particularly preferred betaines are the Carbobetaine [wherein $Y^-=COO^-$], in particular the Carbobetaine of the formula (Ia) and (Ib), more preferred are the Alkylamidobetaine of the formula (Ib).

Examples of suitable betaines and sulfobetaine are the following [designated in accordance with INCI]: Almondamidopropyl of betaines, Apricotamidopropyl betaines, Avocadamidopropyl of betaines, Babassuamidopropyl of betaines, Behenam idopropyl betaines, Behenyl of betaines, betaines, Canolam idopropyl betaines, Capryl/Capram idopropyl betaines, Carnitine, Cetyl of betaines, Cocamidoethyl of betaines, Cocam idopropyl betaines, Cocam idopropyl Hydroxysultaine, Coco betaines, Coco Hydroxysultaine, Coco/Oleam idopropyl betaines, Coco Sultaine, Decyl of betaines, Dihydroxyethyl Oleyl Glycinate, Dihydroxyethyl Soy Glycinate, Dihydroxyethyl Stearyl Glycinate, Dihydroxyethyl Tallow Glycinate, Dimethicone Propyl of PG-betaines, Erucam idopropyl Hydroxysultaine, Hydrogenated Tallow of betaines, Isostearam idopropyl betaines, Lauram idopropyl betaines, Lauryl of betaines, Lauryl Hydroxysultaine, Lauryl Sultaine, Milkam idopropyl betaines, Minkamidopropyl of betaines, Myristam idopropyl betaines, Myristyl of betaines, Oleam idopropyl betaines, Oleam idopropyl Hydroxysultaine, Oleyl of betaines, Olivamidopropyl of betaines, Palmam idopropyl betaines, Palm itam idopropyl betaines, Palmitoyl Carnitine, Palm Kernelam idopropyl betaines, Polytetrafluoroethylene Acetoxypropyl of betaines, Ricinoleam idopropyl betaines, Sesam idopropyl betaines, Soyam idopropyl betaines, Stearam idopropyl betaines, Stearyl of betaines, Tallowam idopropyl betaines, Tallowam idopropyl Hydroxysultaine, Tallow of betaines, Tallow Dihydroxyethyl of betaines, Undecylenam idopropyl betaines and Wheat Germam idopropyl betaines. A preferred betaine is, for example, Cocoamidopropylbetaine.

External Structurant

The compositions of the present disclosure may include an external structurant, which can help to suspend the insoluble cellulose particles. The compositions of the present disclosure may comprise from 0.01% to 10%, by weight of the composition, of the external structurant. The external structurant may be selected from the group consisting of: di-benzylidene polyol acetal derivative; bacterial cellulose; coated bacterial cellulose; non-bacterial-cellulose-derived cellulose fibers; non-polymeric crystalline hydroxyl-functional materials; polymeric structuring agents; di-amido gellants; water-swellable clay; and mixtures thereof.

The composition may comprise from about 0.01 to about 1% by weight of the composition of a non-polymeric crystalline, hydroxyl functional structurant. Said non-polymeric crystalline, hydroxyl functional structurants generally may comprise a crystallizable glyceride which can be pre-emulsified to aid dispersion into the final fluid detergent composition. Crystallizable glycerides may include hydrogenated castor oil or "HCO" or derivatives thereof, provided that it is capable of crystallizing in the liquid detergent composition.

Methods of Making the Composition

The present disclosure relates to methods of making the compositions described herein. The compositions of the invention may be solid (for example granules or tablets) or liquid form. Preferably the compositions are in liquid form. They may be made by any process chosen by the formulator, including by a batch process, a continuous loop process, or combinations thereof.

When in the form of a liquid, the compositions of the invention may be aqueous (typically above 2 wt % or even above 5 or 10 wt % total water, up to 90 or up to 80 wt % or 70 wt % total water) or non-aqueous (typically below 2 wt % total water content). The composition may be a liquid composition that comprises at least about 25% water, or at least about 35% water, or at least about 50% water, or at least about 60% water, by weight of the composition. Typically the compositions of the invention will be in the form of an aqueous solution or uniform dispersion or suspension of optical brightener, DTI and optional additional adjunct materials, some of which may normally be in solid form, that have been combined with the normally liquid components of the composition, such as the liquid alcohol ethoxylate nonionic, the aqueous liquid carrier, and any other normally liquid optional ingredients. Such a solution, dispersion or suspension will be acceptably phase stable. When in the form of a liquid, the detergents of the invention preferably have viscosity from 1 to 1500 centipoises (1-1500 mPa*s), more preferably from 100 to 1000 centipoises (100-1000 mPa*s), and most preferably from 200 to 500 centipoises (200-500 mPa*s) at 20 s-1 and 21° C. Viscosity can be determined by conventional methods. Viscosity may be measured using an AR 550 rheometer from TA instruments using a plate steel spindle at 40 mm diameter and a gap size of 500 μm. The high shear viscosity at 20 s-1 and low shear viscosity at 0.05-1 can be obtained from a logarithmic shear rate sweep from 0.1-1 to 25-1 in 3 minutes time at 21° C. The preferred rheology described therein may be achieved using internal existing structuring with detergent ingredients or by employing an external rheology modifier. More preferably the detergents, such as detergent liquid compositions have a high shear rate viscosity of from about 100 centipoise to 1500 centipoise, more preferably from 100 to 1000 cps. Unit Dose detergents, such as detergent liquid compositions have high shear rate viscosity of from 400 to 1000 cps. Detergents such as laundry softening compositions typically have high shear rate viscosity of from 10 to 1000, more preferably from 10 to 800 cps, most preferably from 10 to 500 cps. Hand dishwashing compositions have high shear rate viscosity of from 300 to 4000 cps, more preferably 300 to 1000 cps.

The cleaning and/or treatment compositions in the form of a liquid herein can be prepared by combining the components thereof in any convenient order and by mixing, e.g., agitating, the resulting component combination to form a phase stable liquid detergent composition. In a process for preparing such compositions, a liquid matrix is formed containing at least a major proportion, or even substantially all, of the liquid components, e.g., nonionic surfactant, the non-surface active liquid carriers and other optional liquid components, with the liquid components being thoroughly admixed by imparting shear agitation to this liquid combination. For example, rapid stirring with a mechanical stirrer may usefully be employed. While shear agitation is maintained, substantially all of any anionic surfactants and the solid form ingredients can be added. Agitation of the mixture is continued, and if necessary, can be increased at this point to form a solution or a uniform dispersion of insoluble solid phase particulates within the liquid phase. After some or all of the solid-form materials have been added to this agitated mixture, particles of any enzyme material to be included, e.g., enzyme granulates, are incorporated. As a variation of the composition preparation procedure hereinbefore described, one or more of the solid components may be added to the agitated mixture as a solution or slurry of particles premixed with a minor portion of one or more of the liquid components. After addition of all of the composition components, agitation of the mixture is continued for a period of time sufficient to form compositions having the requisite viscosity and phase stability characteristics. Frequently this will involve agitation for a period of from about 30 to 60 minutes. The insoluble cationically-modified cellulose particles may be added to a base detergent prior to the addition of the structuring system.

The adjunct ingredients in the compositions of this invention may be incorporated into the composition as the product of the synthesis generating such components, either with or without an intermediate purification step. Where there is no purification step, commonly the mixture used will comprise the desired component or mixtures thereof (and percentages given herein relate to the weight percent of the component itself unless otherwise specified) and in addition unreacted starting materials and impurities formed from side reactions and/or incomplete reaction. For example, for an ethoxylated or substituted component, the mixture will likely comprise different degrees of ethoxylation/substitution.

Method of Use

The present disclosure relates to methods of using the cleaning compositions of the present disclosure to clean a surface, such as a textile. In general, the method includes mixing the cleaning composition as described herein with water to form an aqueous liquor and contacting a surface, preferably a textile, with the aqueous liquor in a laundering step. The target surface may include a greasy soil.

The compositions of this invention, typically prepared as hereinbefore described, can be used to form aqueous washing/treatment solutions for use in the laundering/treatment of fabrics and/or hard surfaces. Generally, an effective amount of such a composition is added to water, for example in a conventional fabric automatic washing machine, to form such aqueous laundering solutions. The aqueous washing solution so formed is then contacted, typically under agitation, with the fabrics to be laundered/treated therewith. An effective amount of the detergent composition herein added to water to form aqueous laundering solutions can comprise amounts sufficient to form from about 500 to 25,000 ppm, or from 500 to 15,000 ppm of composition in aqueous washing solution, or from about 1,000 to 3,000 ppm of the detergent compositions herein will be provided in aqueous washing solution.

Typically, the wash liquor is formed by contacting the detergent with wash water in such an amount so that the concentration of the detergent in the wash liquor is from above 0 g/l to 5 g/l, or from 1 g/l, and to 4.5 g/l, or to 4.0 g/l, or to 3.5 g/l, or to 3.0 g/l, or to 2.5 g/l, or even to 2.0 g/l, or even to 1.5 g/l. The method of laundering fabric or textile may be carried out in a top-loading or front-loading automatic washing machine, or can be used in a hand-wash laundry application. In these applications, the wash liquor formed and concentration of laundry detergent composition in the wash liquor is that of the main wash cycle. Any input of water during any optional rinsing step(s) is not included when determining the volume of the wash liquor.

The wash liquor may comprise 40 liters or less of water, or 30 liters or less, or 20 liters or less, or 10 liters or less, or 8 liters or less, or even 6 liters or less of water. The wash liquor may comprise from above 0 to 15 liters, or from 2 liters, and to 12 liters, or even to 8 liters of water. Typically from 0.01 kg to 2 kg of fabric per liter of wash liquor is dosed into said wash liquor. Typically from 0.01 kg, or from 0.05 kg, or from 0.07 kg, or from 0.10 kg, or from 0.15 kg, or from 0.20 kg, or from 0.25 kg fabric per liter of wash liquor is dosed into said wash liquor. Optionally, 50 g or less, or 45 g or less, or 40 g or less, or 35 g or less, or 30 g or less, or 25 g or less, or 20 g or less, or even 15 g or less, or even 10 g or less of the composition is contacted to water to form the wash liquor. Such compositions are typically employed at concentrations of from about 500 ppm to about 15,000 ppm in solution. When the wash solvent is water, the water temperature typically ranges from about 5° C. to about 90° C. and, when the situs comprises a fabric, the water to fabric ratio is typically from about 1:1 to about 30:1. Typically the wash liquor comprising the detergent of the invention has a pH of from 3 to 11.5.

In one aspect, such method comprises the steps of optionally washing and/or rinsing said surface or fabric, contacting said surface or fabric with any composition disclosed in this specification then optionally washing and/or rinsing said surface or fabric is disclosed, with an optional drying step.

Drying of such surfaces or fabrics may be accomplished by any one of the common means employed either in domestic or industrial settings: machine drying or open-air drying.

The fabric may comprise any fabric capable of being laundered in normal consumer or institutional use conditions, and the invention is particularly suitable for synthetic textiles such as polyester and nylon and especially for treatment of mixed fabrics and/or fibres comprising synthetic and cellulosic fabrics and/or fibres. As examples of synthetic fabrics are polyester, nylon, these may be present in mixtures with cellulosic fibres, for example, polycotton fabrics. The solution typically has a pH of from 7 to 11, more usually 8 to 10.5. The compositions are typically employed at concentrations from 500 ppm to 5,000 ppm in solution. The water temperatures typically range from about 5° C. to about 90° C. The water to fabric ratio is typically from about 1:1 to about 30:1.

COMBINATIONS

Specifically contemplated combinations of the disclosure are herein described in the following lettered paragraphs. These combinations are intended to be illustrative in nature and are not intended to be limiting.

A. A liquid cleaning composition comprising insoluble cationically-modified cellulose particles and a soluble performance polymer, wherein the soluble performance polymer comprises a non-anionic soluble performance polymer.

B. A liquid cleaning composition according to paragraph B, wherein the cellulose particles comprise a cellulose substrate functionalized with a quaternary ammonium compound of formula (I):

where: n is between 1 and 20; $R_1$ is selected from oxiranyl and 2-chloro-1-hydroxylethyl; $R_2$ and $R_3$ are independently selected from alkyl groups $C_{1-6}$ and benzyl; $R_4$ is selected from alkyl groups $C_{1-20}$; and X is selected from the group consisting of Cl, Br, I, tetrafluoroborate, trifluoromethanesulphonate and nitrate.

C. A liquid cleaning composition according to any of paragraphs A-B, wherein the cellulose substrate used to is particulate cellulose or in the form of cellulose nanofibers obtained from electrospinning.

D. A liquid cleaning composition according to any of paragraphs A-B, wherein the cellulose particles have an average size of from about 0.001 μm to about 400 μm, preferably from bout 0.05 μm to about 200 μm.

E. A liquid cleaning composition according to any of paragraphs A-D, wherein the cellulose particles have an average size of from about 1 μm to about 1000 μm.

F. A liquid cleaning composition according to any of paragraphs A-E, wherein the cellulose particles are selected from the group consisting of microcrystalline cellulose, cellulose powder, microfibrillated cellulose, nanocrystalline cellulose, cellulose nanofibers obtained by electrospinning and then subsequently crushed, and mixtures thereof, more preferably selected from the group consisting of microcrystalline cellulose, microfibrillated cellulose, and mixtures thereof.

G. A liquid cleaning composition according to any of paragraphs A-F, wherein the cellulose particles are characterized by an aspect ratio of from about 1 to about 100.

H. A liquid cleaning composition according to any of paragraphs A-G, wherein the composition comprises from about 0.1% to about 5%, by weight of the composition, of the cellulose particles.

I. A liquid cleaning composition according to any of paragraphs A-H, wherein the composition comprises at least 0.2%, by weight of the composition, of soluble performance polymer.

J. A liquid cleaning composition according to any of paragraphs A-I, wherein the composition comprises less than 1%, by weight of the composition, of anionic soluble performance polymer.

K. A liquid cleaning composition according to any of paragraphs A-J, wherein the composition is substantially free of anionic soluble performance polymer.

L. A liquid cleaning composition according to any of paragraphs A-K, wherein the soluble performance polymer is selected from: polymeric soil release agents; polymeric dispersing agents; alkoxylated polyamine polymers; polymeric grease cleaning polymers; cellulosic polymers; and mixtures thereof.

M. A liquid cleaning composition according to any of paragraphs A-L, wherein the non-anionic soluble performance polymer comprises a polymeric soil release agent.

N. A liquid cleaning composition according to any of paragraphs A-M, wherein the non-anionic soluble performance polymer comprises an alkoxylated polyamine polymer, preferably an ethoxylated polyethyleneimine and/or an ethoxylated hexamethylene diamine O. A cleaning composition according to any of paragraphs A-N, wherein the cleaning composition further comprises from about 1% to about 80%, by weight of the cleaning composition, of a surfactant system.

P. A cleaning composition according to any of paragraphs A-O, wherein the surfactant system comprises an anionic surfactant, preferably selected from the group consisting of alkyl sulfate, alkyl alkoxy sulfate, alkyl benzene sulfonate, paraffin sulfonate, and mixtures thereof.

Q. A liquid cleaning composition according to any of paragraphs A-P, wherein the composition comprises less than about 20%, by weight of the composition, of water.

R. A liquid cleaning composition according to any of paragraphs A-Q, wherein the cleaning composition is in the form of a unitized dose article where the composition is encapsulated by a water-soluble film.

S. A liquid cleaning composition according to any of paragraphs A-R, wherein the water-soluble film forms at least two compartments, wherein the composition is in at least one of the compartments.

T. A liquid cleaning composition according to any of paragraphs A-S, wherein the composition comprises at least about 25% water, by weight of the composition.

U. A method of cleaning a surface, preferably a textile, comprising mixing the cleaning composition according to any of paragraphs A-T with water to form an aqueous liquor and contacting a surface, preferably a textile, with the aqueous liquor in a laundering step.

EXAMPLES

The following examples are intended to be exemplary and non-limiting.

Example 1: Synthesis of Insoluble Cationically Modified Cellulose

A mixture of NaOH, glycidyl trimethylammonium chloride and the cellulose particles was prepared so that the molar ratio of cellulose/NaOH/glycidyl trimethylammonium chloride was 1/4.1/2.1. The mixture was stirred for 1 hour at room temperature by mechanical stirring at 1000 rpm.

The cellulose particles were then filtered to remove excess solution, leaving the modified cellulosic material. The material was placed in an oven at 100° C. for 30 minutes. Afterwards, the final product was washed with water repeatedly until the water washings had a neutral pH. The resulting material was dried at 80° C. for 20 hours.

Example 2-8: Heavy Duty Liquid Laundry Detergent Compositions

| Ingredients | 2 | 3 | 4 | 5 | 6 | 7 | 8 |
|---|---|---|---|---|---|---|---|
| | % weight | | | | | | |
| $AE_{1.8}S$ | 6.77 | 5.16 | 1.36 | 1.30 | — | — | — |
| $AE_3S$ | — | — | — | — | 0.45 | — | — |
| LAS | 0.86 | 2.06 | 2.72 | 0.68 | 0.95 | 1.56 | 3.55 |
| HSAS | 1.85 | 2.63 | 1.02 | — | — | — | — |
| AE9 | 6.32 | 9.85 | 10.20 | 7.92 | — | — | — |
| AE8 | — | — | — | — | — | — | 35.45 |
| AE7 | — | — | — | — | 8.40 | 12.44 | — |
| $C_{12-14}$ dimethyl Amine Oxide | 0.30 | 0.73 | 0.23 | 0.37 | — | — | — |
| $C_{12-18}$ Fatty Acid | 0.80 | 1.90 | 0.60 | 0.99 | 1.20 | — | 15.00 |
| Citric Acid | 2.50 | 3.96 | 1.88 | 1.98 | 0.90 | 2.50 | 0.60 |
| Optical Brightener 1 | 1.00 | 0.80 | 0.10 | 0.30 | 0.05 | 0.50 | 0.001 |
| Optical Brightener 3 | 0.001 | 0.05 | 0.01 | 0.20 | 0.50 | — | 1.00 |
| Sodium formate | 1.60 | 0.09 | 1.20 | 0.04 | 1.60 | 1.20 | 0.20 |
| DTI 1 | 0.32 | 0.05 | — | 0.60 | 0.10 | 0.60 | 0.01 |
| DTI 2 | 0.32 | 0.10 | 0.60 | 0.60 | 0.05 | 0.40 | 0.20 |
| Sodium hydroxide | 2.30 | 3.80 | 1.70 | 1.90 | 1.70 | 2.50 | 2.30 |
| Monoethanolamine | 1.40 | 1.49 | 1.00 | 0.70 | — | — | — |
| Diethylene glycol | 5.50 | — | 4.10 | — | — | — | — |
| Chelant 1 | 0.15 | 0.15 | 0.11 | 0.07 | 0.50 | 0.11 | 0.80 |
| 4-formyl-phenylboronic acid | — | — | — | — | 0.05 | 0.02 | 0.01 |
| Sodium tetraborate | 1.43 | 1.50 | 1.10 | 0.75 | — | 1.07 | — |
| Ethanol | 1.54 | 1.77 | 1.15 | 0.89 | — | 3.00 | 7.00 |

-continued

| Ingredients | 2 | 3 | 4 | 5 | 6 | 7 | 8 |
|---|---|---|---|---|---|---|---|
| | | | | % weight | | | |
| Polymer 1 | 0.10 | — | — | — | — | — | 2.00 |
| Polymer 2 | 0.30 | 0.33 | 0.23 | 0.17 | — | — | — |
| Polymer 3 | — | — | — | — | — | — | 0.80 |
| Polymer 4 | 0.80 | 0.81 | 0.60 | 0.40 | 1.00 | 1.00 | — |
| 1,2-Propanediol | — | 6.60 | — | 3.30 | 0.50 | 2.00 | 8.00 |
| Structurant | 0.10 | — | — | — | — | — | 0.10 |
| Insoluble cationically modified cellulose | 0.1 | — | — | — | — | — | 0.5 |
| Perfume | 1.60 | 1.10 | 1.00 | 0.80 | 0.90 | 1.50 | 1.60 |
| Perfume encapsulate | 0.10 | 0.05 | 0.01 | 0.02 | 0.10 | 0.05 | 0.10 |
| Protease | 0.80 | 0.60 | 0.70 | 0.90 | 0.70 | 0.60 | 1.50 |
| Mannanase | 0.07 | 0.05 | 0.045 | 0.06 | 0.04 | 0.045 | 0.10 |
| Amylase 1 | 0.30 | — | 0.30 | 0.10 | — | 0.40 | 0.10 |
| Amylase 2 | — | 0.20 | 0.10 | 0.15 | 0.07 | — | 0.10 |
| Xyloglucannase | 0.20 | 0.10 | — | — | 0.05 | 0.05 | 0.20 |
| Lipase | 0.40 | 0.20 | 0.30 | 0.10 | 0.20 | — | — |
| Polishing enzyme | — | 0.04 | — | — | — | 0.004 | — |
| Acid Violet 50 | 0.05 | — | — | — | — | — | 0.005 |
| Direct Violet 9 | — | — | — | — | — | 0.05 | — |
| Violet DD | — | 0.035 | 0.02 | 0.037 | 0.04 | — | — |
| Dye control agent | 0.2 | 0.3 | 0.2 | 0.03 | 1.2 | 0.3 | 0.3 |
| Water, dyes & minors | | | | Balance | | | |
| pH | | | | 8.2 | | | |

Based on total cleaning and/or treatment composition weight. Enzyme levels are reported as raw material.

Examples 9 to 19: Unit Dose Compositions

These examples provide various formulations for unit dose laundry detergents. Compositions 9 to 13 comprise a single unit dose compartment. The film used to encapsulate the compositions is polyvinyl-alcohol-based film.

| Ingredients | 9 | 10 | 11 | 12 | 13 |
|---|---|---|---|---|---|
| | | | % weight | | |
| LAS | 19.09 | 16.76 | 8.59 | 6.56 | 3.44 |
| AE3S | 1.91 | 0.74 | 0.18 | 0.46 | 0.07 |
| AE7 | 14.00 | 17.50 | 26.33 | 28.08 | 31.59 |
| Citric Acid | 0.6 | 0.6 | 0.6 | 0.6 | 0.6 |
| C12-15 Fatty Acid | 14.8 | 14.8 | 14.8 | 14.8 | 14.8 |
| Polymer 3 | 4.0 | 4.0 | 4.0 | 4.0 | 4.0 |
| Chelant 2 | 1.2 | 1.2 | 1.2 | 1.2 | 1.2 |
| Optical Brightener 1 | 0.20 | 0.25 | 0.01 | 0.01 | 0.50 |
| Optical Brightener 2 | 0.20 | — | 0.25 | 0.03 | 0.01 |
| Optical Brightener 3 | 0.18 | 0.09 | 0.30 | 0.01 | — |
| DTI 1 | 0.10 | — | 0.20 | 0.01 | 0.05 |
| DTI 2 | — | 0.10 | 0.20 | 0.25 | 0.05 |
| Glycerol | 6.1 | 6.1 | 6.1 | 6.1 | 6.1 |
| Monoethanol amine | 8.0 | 8.0 | 8.0 | 8.0 | 8.0 |
| Tri-isopropanol amine | — | — | 2.0 | — | — |
| Tri-ethanol amine | — | 2.0 | — | — | — |
| Cumene sulfonate | — | — | — | — | 2.0 |
| Protease | 0.80 | 0.60 | 0.07 | 1.00 | 1.50 |
| Mannanase | 0.07 | 0.05 | 0.05 | 0.10 | 0.01 |
| Amylase 1 | 0.20 | 0.11 | 0.30 | 0.50 | 0.05 |
| Amylase 2 | 0.11 | 0.20 | 0.10 | — | 0.50 |
| Polishing enzyme | 0.005 | 0.05 | — | — | — |
| Cyclohexyl dimethanol | — | — | — | 2.0 | — |
| Acid violet 50 | 0.03 | 0.02 | — | — | — |
| Violet DD | — | — | 0.01 | 0.05 | 0.02 |
| Structurant | 0.14 | 0.14 | 0.14 | 0.14 | 0.14 |
| Insoluble cationically modified cellulose | 0.2 | 0.3 | 0.2 | 0.1 | 0.1 |
| Perfume | 1.9 | 1.9 | 1.9 | 1.9 | 1.9 |
| Dye control agent | 0.1 | 0.3 | 0.2 | 0.5 | 0.3 |
| Water and miscellaneous | | | To 100% | | |
| pH | | | 7.5-8.2 | | |

Based on total cleaning and/or treatment composition weight. Enzyme levels are reported as raw material.

In the following examples the unit dose has three compartments, but similar compositions can be made with two, four or five compartments. The film used to encapsulate the compartments is polyvinyl alcohol.

| | Base compositions | | | |
|---|---|---|---|---|
| Ingredients | 14 | 15 | 16 | 17 |
| | | % weight | | |
| HLAS | 26.82 | 16.35 | 7.50 | 3.34 |
| AE7 | 17.88 | 16.35 | 22.50 | 30.06 |
| Citric Acid | 0.5 | 0.7 | 0.6 | 0.5 |
| C12-15 Fatty acid | 16.4 | 6.0 | 11.0 | 13.0 |
| Polymer 1 | 2.9 | 0.1 | — | — |
| Polymer 3 | 1.1 | 5.1 | 2.5 | 4.2 |
| Polyquaternium 10 | — | — | 0.3 | 0.5 |
| Polymer 6 | — | 1.5 | 0.3 | 0.2 |
| Chelant 2 | 1.1 | 2.0 | 0.6 | 1.5 |
| Optical Brightener 1 | 0.20 | 0.25 | 0.01 | 0.005 |
| Optical Brightener 3 | 0.18 | 0.09 | 0.30 | 0.005 |
| DTI 1 | 0.1 | — | 0.2 | — |
| DTI 2 | — | 0.1 | 0.2 | — |
| Glycerol | 5.3 | 5.0 | 5.0 | 4.2 |
| Monoethanolamine | 10.0 | 8.1 | 8.4 | 7.6 |
| Polyethylene glycol | — | — | 2.5 | 3.0 |
| Potassium sulfite | 0.2 | 0.3 | 0.5 | 0.7 |
| Protease | 0.80 | 0.60 | 0.40 | 0.80 |
| Amylase 1 | 0.20 | 0.20 | 0.200 | 0.30 |
| Polishing enzyme | — | — | 0.005 | 0.005 |
| MgCl$_2$ | 0.2 | 0.2 | 0.1 | 0.3 |
| Structurant | 0.2 | 0.1 | 0.2 | 0.2 |
| Insoluble cationically modified cellulose | 0.1 | 0.1 | 0.1 | 0.1 |
| Acid Violet 50 | 0.04 | 0.03 | 0.05 | 0.03 |
| Perfume/encapsulates | 0.10 | 0.30 | 0.01 | 0.05 |
| Dye control agent | 0.2 | 0.03 | 0.4 | 1.2 |
| Solvents and misc. | | | To 100% | |
| pH | | | 7.0-8.2 | |

-continued

| | Finishing compositions | | | | | |
|---|---|---|---|---|---|---|
| | 18 | | | 19 | | |
| | Compartment | | | | | |
| | A | B | C | A | B | C |
| | Volume of each compartment | | | | | |
| | 40 ml | 5 ml | 5 ml | 40 ml | 5 ml | 5 ml |
| Ingredients | Active material in Wt. % | | | | | |
| Perfume | 1.6 | 1.6 | 1.6 | 1.6 | 1.6 | 1.6 |
| Violet DD | 0 | 0.006 | 0 | 0 | 0.004 | — |
| TiO2 | — | — | 0.1 | — | — | 0.1 |
| Sodium Sulfite | 0.4 | 0.4 | 0.4 | 0.3 | 0.3 | 0.3 |
| Polymer 5 | — | — | — | 2 | — | — |
| Hydrogenated castor oil | 0.14 | 0.14 | 0.14 | 0.14 | 0.14 | 0.14 |
| Base Composition 14, 15, 16 or 17 | Add to 100% | | | | | |

Based on total cleaning and/or treatment composition weight, enzyme levels are reported as raw material.

| | |
|---|---|
| AE1.8S | is $C_{12-15}$ alkyl ethoxy (1.8) sulfate |
| AE3S | is $C_{12-15}$ alkyl ethoxy (3) sulfate |
| AE7 | is $C_{12-13}$ alcohol ethoxylate, with an average degree of ethoxylation of 7 |
| AE8 | is $C_{12-13}$ alcohol ethoxylate, with an average degree of ethoxylation of 8 |
| AE9 | is $C_{12-13}$ alcohol ethoxylate, with an average degree of ethoxylation of 9 |
| Amylase 1 | is Stainzyme ®, 15 mg active/g, supplied by Novozymes |
| Amylase 2 | is Natalase ®, 29 mg active/g, supplied by Novozymes |
| Xyloglucanase | is Whitezyme ®, 20 mg active/g, supplied by Novozymes |
| Chelant 1 | is diethylene triamine pentaacetic acid |
| Chelant 2 | is 1-hydroxy ethane 1,1-diphosphonic acid |
| DTI 1 | is poly(4-vinylpyridine-1-oxide) (such as Chromabond S-403E ®), |
| DTI 2 | is poly(1-vinylpyrrolidone-co-1-vinylimidazole) (such as Sokalan HP56 ®). |
| Dye control agent | Dye control agent in accordance with the invention, for example Suparex ® O.IN (M1), Nylofixan ® P (M2), Nylofixan ® PM (M3), or Nylofixan ® HF (M4) |
| HSAS | is mid-branched alkyl sulfate as disclosed in U.S. Pat. No. 6,020,303 and U.S. Pat. No. 6,060,443 |
| LAS | is linear alkylbenzenesulfonate having an average aliphatic carbon chain length $C_9$-$C_{15}$ (HLAS is acid form). |
| Lipase | is Lipex ®, 18 mg active/g, supplied by Novozymes |
| Mannanase | is Mannaway ®, 25 mg active/g, supplied by Novozymes |
| Optical Brightener 1 | is disodium 4,4'-bis{[4-anilino-6-morpholino-s-triazin-2-yl]-amino}-2,2'-stilbenedisulfonate |
| Optical Brightener 2 | is disodium 4,4'-bis-(2-sulfostyryl)biphenyl (sodium salt) |
| Optical Brightener 3 | is Optiblanc SPL10 ® from 3V Sigma |
| Perfume encapsulate | is a core-shell melamine formaldehyde perfume microcapsules. |
| Polishing enzyme | is Para-nitrobenzyl esterase, reported as 1000 mg active/g |
| Polymer 1 | is bis(($C_2H_5O$)($C_2H_4O$)n)($CH_3$)—$N^+$—$C_xH_{2x}$—$N^+$—($CH_3$)—bis(($C_2H_5O$)($C_2H_4O$)n), wherein n = 20-30, x = 3 to 8 or sulphated or sulfonated variants thereof |
| Polymer 2 | is ethoxylated ($EO_{15}$) tetraethylene pentamine |
| Polymer 3 | is ethoxylated polyethylenimine |
| Polymer 4 | is ethoxylated hexamethylene diamine |
| Polymer 5 | is Acusol 305, provided by Rohm&Haas |
| Polymer 6 | is a polyethylene glycol polymer grafted with vinyl acetate side chains, provided by BASF. |
| Protease | is Purafect Prime ®, 40.6 mg active/g, supplied by DuPont |
| Structurant | is Hydrogenated Castor Oil |
| Violet DD | is a thiophene azo dye provided by Milliken |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A liquid cleaning composition comprising:
   a) insoluble cationically-modified cellulose particles selected from the group consisting of microcrystalline cellulose, microfibrillated cellulose, nanocrystalline cellulose, cellulose nanofibers obtained by electrospinning and subsequently crushing the nanofibers, and mixtures thereof, wherein the cellulose particles have an average size of from 0.05 to 200 µm;

b) an external structurant selected from the group consisting of di-benzylidene polyol acetal derivative, bacterial cellulose, coated bacterial cellulose, di-amido gellants, and mixtures thereof;

c) a non-anionic soluble performance polymer selected from the group consisting of an alkoxylated polyamine polymer, an ethoxylated polyethyleneimine, an ethoxylated hexamethylene diamine, or mixtures thereof; and d) at least about 25% by weight of the composition of water.

2. A liquid cleaning composition according to claim 1, wherein the cellulose particles comprise a cellulose substrate functionalized with a quaternary ammonium compound of formula (I):

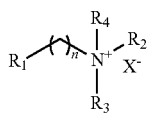

where:

n is between 1 and 20;

$R_1$ is selected from oxiranyl and 2-chloro-1-hydroxylethyl;

$R_2$ and $R_3$ are independently selected from alkyl groups $C_{1-6}$ and benzyl;

$R_4$ is selected from alkyl groups $C_{1-20}$;

X is selected from the group consisting of Cl, Br, I, tetrafluoroborate, trifluoromethanesulphonate and nitrate.

3. A liquid cleaning composition according to claim 1, wherein the cellulose substrate used is in the form of cellulose nanofibers obtained from electrospinning.

4. A liquid cleaning composition according to claim 1, wherein the cellulose particles are characterized by an aspect ratio of from about 1 to about 100.

5. A liquid cleaning composition according to claim 1, wherein the composition comprises from about 0.1% to about 5%, by weight of the composition, of the cellulose particles.

6. A liquid cleaning composition according to claim 1, wherein the composition comprises at least 0.2%, by weight of the composition, of soluble performance polymer.

7. A liquid cleaning composition according to claim 1, wherein the composition further comprises less than 1%, by weight of the composition, of anionic soluble performance polymer.

8. A cleaning composition according to claim 1, wherein the cleaning composition further comprises from about 1% to about 80%, by weight of the cleaning composition, of a surfactant system.

9. A cleaning composition according to claim 1, wherein the surfactant system comprises an anionic surfactant selected from the group consisting of alkyl sulfate, alkyl alkoxy sulfate, alkyl benzene sulfonate, paraffin sulfonate, and mixtures thereof.

10. A method of cleaning a surface comprising mixing the cleaning composition according to claim 1 with water to form an aqueous liquor and contacting a surface with the aqueous liquor in a laundering step.

* * * * *